United States Patent
Hohmann et al.

[11] Patent Number: 6,131,302
[45] Date of Patent: *Oct. 17, 2000

[54] DEVICE FOR MEASURING THE EXTENSION OF A THREADED BOLT OR SCREW

[76] Inventors: Jörg Hohmann, Hubertusweg 11; Frank Hohmann, Beethovenstrasse 9, both of D-59581 Warstein, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/000,168
[22] PCT Filed: Jul. 8, 1995
[86] PCT No.: PCT/EP96/02901
§ 371 Date: Jan. 8, 1998
§ 102(e) Date: Jan. 8, 1998
[87] PCT Pub. No.: WO97/03296
PCT Pub. Date: Jan. 30, 1997

[30] Foreign Application Priority Data

Jul. 8, 1995 [DE] Germany ............................ 195 24 959

[51] Int. Cl.[7] ...................................................... G01B 5/00
[52] U.S. Cl. ................................ 33/833; 33/700; 33/679.1
[58] Field of Search ............................... 33/833, 562, 700, 33/709, 832, 501, 679.1

[56] References Cited

U.S. PATENT DOCUMENTS

| 3,413,726 | 12/1968 | Sankovich | 33/833 |
| 3,691,826 | 9/1972 | Grabovac . | |
| 4,653,191 | 3/1987 | Gasser | 33/833 |
| 4,918,825 | 4/1990 | Lesh et al. | 33/833 |
| 4,981,404 | 1/1991 | Chamberlain et al. . | |
| 5,619,805 | 4/1997 | Greenslade | 33/833 |
| 5,661,888 | 9/1997 | Hanslik | 33/833 |

FOREIGN PATENT DOCUMENTS

| 0393852 | 10/1990 | European Pat. Off. . |
| 2422227 | 11/1979 | France . |
| 9408009 | 9/1994 | Germany . |
| 9322568 | 11/1993 | WIPO . |

Primary Examiner—Christopher W. Fulton
Attorney, Agent, or Firm—Robert W. Becker & Associates

[57] ABSTRACT

A measuring device for measuring the extension of a threaded bolt or a screw tightened by a nut has an extension measuring scale provided at a circumference of either the nut, of a screw head of the screw, or of a tightening element rotatable relative to the nut or the screw head of the screw. Reference marks for the measuring scale are arranged stationary relative to the extension measuring scale.

21 Claims, 1 Drawing Sheet

DEVICE FOR MEASURING THE EXTENSION OF A THREADED BOLT OR SCREW

BACKGROUND OF THE INVENTION

The invention concerns a device for measuring the extension of a threaded bolt or screw tightened by means of a nut.

To apply a specific preload to mounting screws used in mechanical engineering, these screws and/or nuts are tightened mainly with torque wrenches.

These wrenches may be operated manually, driven electrically, or hydraulically. With torque wrenches as tightening devices, it is disadvantageous that no definite relation can be made between the torque applied and the tension of the bolt and/or screw actually achieved. This is caused by the varying coefficients of friction within the thread and between the contact areas of the screw head and/or the nut used for tightening the screw or threaded bolt.

To determine the exact preload of the screw, it is necessary to measure of the achieved screw extension that is directly proportional to the applied preload. For exact measurements of the actual extension of the screw, both screw ends have to be accessible for measuring. If only one screw end is accessible for the measurement, the extension can only be measured relative to the nut contact area, resulting in inaccuracies that are caused by seating effects in the contact area and by compression of the flanges to be tightened by means of the screw. The extension can only be measured when the screw end is accessible to a measuring device, e.g., a dial gauge. Generally, the screw tightening device must be removed before the extension can be measured.

In the German petty patent document G 94 08 009.7, a ratchet wrench for angle tightening with visual and audible indication is described, wherein the screw, in particular, of a screw connection is first fastened to only a small torque with a conventionally known torque wrench in order to apply the desired preload to the shanks of screws inserted into the work piece, in particular, reduced-shaft screws. The extension of the screws in the ductile range is then achieved by further tightening the screws by a specific rotation angle. For this, the tensioning tool comprises a disk with an angle measuring scale coaxially positioned to the rotational axis of a securing attachment and indicator marks cooperating with the angle measuring scale. The disk comprising the angle measuring scale and the indicator marks are rotatable against each other coaxially to the rotational axis of the securing attachment, lock-connected with the tensioning tool on the one hand, and, on the other hand, lockably mounted to the work piece to prevent rotation. This fixation is provided by a flexible shape-retaining bar comprised of a wire spiral with a magnet head on its free end engaging the work piece. Between the securing attachment and the lever arm for rotating the securing attachment, a ratchet is provided for rotating the securing attachment in several strokes until the final rotation angle is achieved.

The object of the invention is to provide a device for measuring the extension of a threaded bolt or screw that is fast and easy to use and, in particular, during tightening of the nut or screw, allows a reading of the extension. The measurement should at least be as exact as a measurement with a dial gauge and should significantly exceed the accuracy that can be achieved with a torque wrench.

SUMMARY OF THE INVENITON

Based on this, a device for measuring the extension of a threaded bolt or screw tightened by means of a nut is suggested, that inventively comprises an extension measuring scale at the circumference of the nut, the screw head or a tightening element rotatable relative to the nut or screw head, as well as reference marks that are stationary in relation to the extension measuring scale.

By turning the nut to fasten the threaded bolt or screw in an embodiment of this kind, the extension of the threaded bolt or screw is indicated directly and, at any given time, on the extension measuring scale relative to the reference marks. The indicated extension values are completely independent of the friction conditions in the thread between the nut and the threaded bolt or the screw as well as relative to the contact area and show the actual extension of the threaded bolt or screw with the desired accuracy, when the nut is first tightened to a point where the washers (if present) and the flanges to be connected have sufficiently seated and play between the individual elements to be tightened are eliminated. When the nut is tightened further, the reading on the extension measuring scale relative to the fixed reference marks provides continuously the actual extension of the threaded bolt or screw without requiring removal of the tightening device.

By reversing the embodiment mentioned first, the extension measuring scale can also be positioned at the circumference of a work piece that is stationary relative to the nut, screw head, or a tightening element rotatable relative to the nut or screw head, and the reference marks can be positioned at the nut, screw head, or the tightening element rotatable relative to the nut or screw head, without affecting the achievable effects or benefits.

For the direct reading during tightening, it is advantageous to provide the extension measuring scale with a graduation in millimeters or fractions thereof and to provide the reference marks as a vernier.

With highly loaded threaded bolts or screws that must fulfill higher safety requirements, it is advantageous, when the nut threaded onto the threaded bolt or screw for tightening the threaded bolt or screw, or the screw itself is not turned in order to prevent the transfer of torsion forces through friction in the thread of the nut and the threaded bolt or screw onto the threaded bolt or the screw and of lateral forces due to eccentric shifting of the threaded bolt or screw in the bore hole. According to another embodiment of the invention, the nut threaded onto the threaded end of a threaded bolt may comprise an outer thread for a tightening element that can be threaded against a contact surface, so that the tightening element has the extension measuring scale or the reference marks and a component stationary relative to the tightening element has the reference marks or the extension measuring scale.

The inner and outer threads of the nut may be comprised of the same or a different pitch.

Preferably, the tightening element is supported at a nonrotatable washer positioned opposite the contact surface, wherein the tightening element with its crowned ring surface is supported at a complementary embodied surface of the washer to compensate unevenness of the contact surface.

The torsion lock for the washer may be a screw that can be tightened against the contact surface, a knurl, or a crown gearing facing the contact area.

If a torsion lock is provided between the washer and its contact surface, the washer may also be used to provide a torsion lock for the nut relative to the threaded bolt or screw. This torsion lock advantageously allows a relative axial displacement and may be embodied, in particular, as a hexagon insert bit at the end of the nut adjacent to the washer and a hexagon socket at the washer surrounding the hexagon insert bit with play.

In the inventive embodiment with a nut, wherein a tightening element surrounding the nut is supported by a washer at a contact surface, the extension measuring scale may advantageously be provided at a cylindrical circumference of the washer and the reference marks at an adjacent cylindrical area of the tightening element, so that the extension value is easy to read, even when the tightening device is attached to the tightening element.

In this embodiment, the tightening device can be supported at a hexagon insert bit on the washer, when the tightening element is rotated by this tightening device acting on a hexagon insert bit of the tightening element.

BRIEF DESCRIPTION OF THE DRAWINGS

The invention is disclosed in detail with the aid of the following preferred embodiment shown in the drawing. The drawing shows.

DESCRIPTION OF PREFERRED EMBODIMENTS

Figure 1:
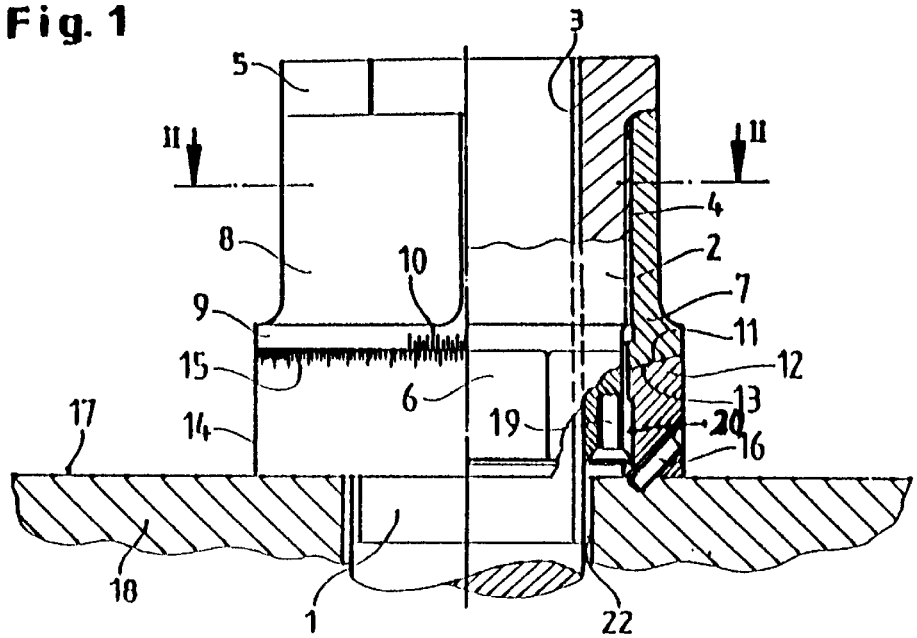
FIG. 1: A side view of the inventive measuring device, partially in cross-section.
Figure 2:
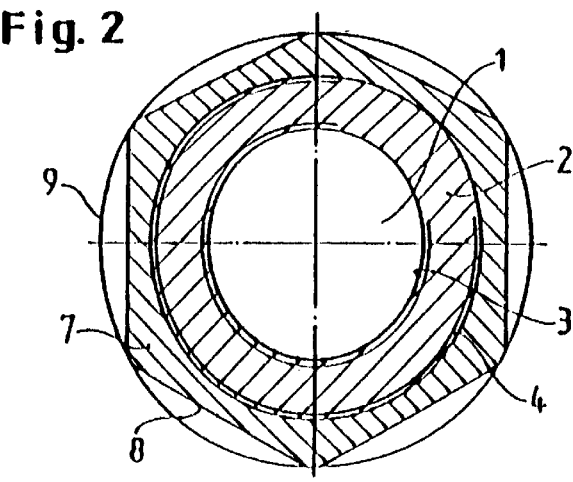
FIG. 2: A cross-sectional view along the section line II–II shown in FIG. 1, and FIG. 3: A bottom view of the measuring device.
Figure 3:
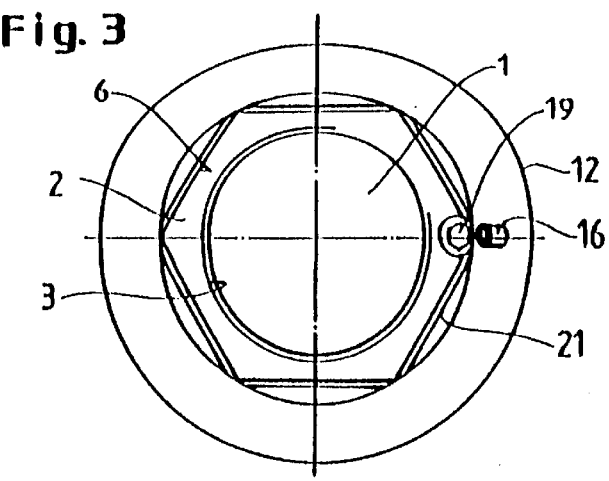

A threaded bolt 1 is inserted into a bore 22 in a flange 18 and is to be tightened such that it reaches an extension predetermined for its use. Accordingly, a tightening device comprising a nut 2, having an inner thread 3 that can be threaded onto the threaded bolt 1 and an outer thread 4, is threaded onto the threaded bolt 1, after a tightening element 7 in the shape of an outer nut has been threaded onto the outer thread 4 of the nut 2. Additionally, a washer 12 is attached to the nut 2 by means of a mounting screw 19 that partially protrudes with its head into an axial slot 20 of the washer 12.

The nut 2 is threaded onto the threaded end of the threaded bolt 1, until the washer 12 is seated against the shoulder of a contact surface 17 of the flange and tightened with suitable means, until all play at the threads 3, 4 and the contact surfaces between the tightening element 7, the washer 12, and the flange 18 is eliminated.

The nut 2 comprises a hexagon insert bit 5 in the upper end area and another hexagon insert bit 6 in the lower end area adjacent to the washer 12. This hexagon insert bit cooperates with play with a hexagon socket 21 on the washer 12, so that the nut 2 can only be rotated together with the washer 12, i.e., is prevented from rotating by washer 12.

The tightening element 7 is provided with a hexagon insert bit 8 and a cylindrical area 9 adjacent to the washer 12. On this cylindrical area 9, reference marks in form of a vernier 10 are provided. The tightening element 7 is seated with a crowned ring surface 11 against a complementary ring surface 13 of the washer 12.

The washer 12 comprises a cylindrical circumference 14 with an extension measuring scale 15 adjacent to the cylindrical area 9 of the tightening element 7. This extension measuring scale 15 extends about the entire cylindrical circumference 14 of the washer 12 or over a portion thereof if this is sufficient for the measuring required extension of the threaded bolt 1. The graduation of the extension measuring scale 15 is provided in millimeters or fractions thereof, so that the extension of the threaded bolt 1 can be read directly in millimeters or fractions thereof with the help of the vernier 10.

In an angular threaded bore of the washer 12 a screw 16 is arranged. When the washer 12 is seated against the contact surface 17, the screw 16 can be tightened against this contact surface 17 and, in this manner, provide a torsion lock for the washer 12. Also via the hexagon socket 21 on the washer 12 and the hexagon insert bit 6 on the nut 2, the screw 16 provides a torsion lock for the nut 2.

Instead of the torsion lock embodied as a screw, the bottom side of the washer 12 may also be provided with a knurl or a crown gearing that presses against the contact surface 17 and, in this manner, provides a torsion lock.

To hold the nut 2, the tightening element 7, and the washer 12 together before the threaded bolt 1 is threaded onto the threaded bolt 1, a mounting screw 19 is threaded into the bottom side of the nut 2 and partially protrudes with its head into an axial slot 20 of the washer 12.

The required extension is applied to the threaded bolt 1 by rotating the tightening element 7 with a suitable tightening device relative to the nut 2. Hereby, the non-represented tightening device is supported by the hexagon insert bit 5 at the nut 2 whose rotation is prevented by the washer 12, so that no additional torque support for the tightening device is necessary. The extensions achieved during the tightening procedure can be continuously monitored without removal of the tightening device by means of the extension measuring scale 15 and the reference marks 10, until the required final torque is achieved.

The measuring device mentioned above is especially advantageous for the use of highly loaded threaded bolts that should not be exposed to torsional and lateral stress during tightening. When torsional stress of this kind is allowed during tightening, the division into nut and tightening element, embodied as an outer nut, is not necessary. Instead, a regular nut with hexagon insert bit, which may be embodied as a cap nut, can be supported by a washer, wherein the nut adjacent to the washer may be provided with the reference marks or the extension measuring scale, while the washer is embodied with the extension measuring scale or the reference marks. The accuracy of the reading is not affected by this arrangement. However, the threaded bolt, as previously mentioned, is exposed to torsional stress due to the thread friction that superimposes the extension stress and is not always permissible. Corresponding considerations have to be made for the tightening of screws.

The present invention is, of course, in no way restricted to the specific disclosure of the specification and drawings, but also encompasses any modifications within the scope of the appended claims.

What is claimed is:

1. An apparatus for measuring an extension distance from a flange of a threaded bolt or screw when tightened by a nut comprising:

an extension measuring scale on a rotatable surface which rotates concurrently during bolt or screw tightening and rotates perpendicular to a direction of an extension of the threaded bolt or screw; and reference marks on a stationary surface which abuts against said rotatable surface, wherein when said threaded bolt or screw is tightened, an extension measuring scale movement when compared to said reference marks from a starting position corresponds to said extension distance from the flange.

2. The invention of claim 1 wherein said extension measuring scale comprises millimeters or fractions of millimeters.

3. The invention of claim 1 wherein said rotatable surface comprises a screw head or a nut.

4. The invention of claim 3 wherein said nut comprises an outer thread for receiving a tightening element.

5. The invention of claim 4 wherein said tightening element comprises said rotatable surface.

6. The invention of claim 3 further comprising a washer affixed to said nut whereby said washer is rotatable only with said nut.

7. The invention of claim 6 further comprising a torsion lock for said washer.

8. The invention of claim 7 wherein said torsion lock comprises a member from the group consisting of a screw tightened against a contact surface, a knurl and a crown gearing facing said contact surface.

9. The invention of claim 6 wherein said tightening element comprises a hexagon insert in said washer.

10. The invention of claim 1 wherein said stationary surface comprises a work piece.

11. The invention of claim 1 wherein said starting position comprises seating said rotatable surface onto said-stationary surface and eliminating play between said rotatable surface and said stationary surface.

12. An apparatus for measuring an extension distance from a flange of a threaded bolt or screw when tightened by a nut comprising:

an extension measuring scale on a stationary surface; and reference marks on a rotatable surface which rotates concurrently during bolt or screw tightening and rotates perpendicular to a direction of an extension of the threaded bolt or screw which abuts against said stationary surface, wherein when said threaded bolt or screw is tightened, an extension measuring scale movement when compared to said reference marks from a starting position corresponds to said extension distance from the flange.

13. The invention of claim 12 wherein said extension measuring scale comprises millimeters or fractions of millimeters.

14. The invention of claim 12 wherein said rotatable surface comprises a screw head or a nut.

15. The invention of claim 14 wherein said nut comprises an outer thread for receiving a tightening element.

16. The invention of claim 15 wherein said tightening element comprises said rotatable surface.

17. The invention of claim 14 further comprising a washer affixed to said nut whereby said washer is rotatable only with said nut.

18. The invention of claim 17 further comprising a torsion lock for said washer.

19. The invention of claim 18 wherein said torsion lock comprises a member from the group consisting of a screw tightened against a contact surface, a knurl and a crown gearing facing said contact surface.

20. The invention of claim 17 wherein said tightening element comprises a hexagon insert in said washer.

21. The invention of claim 12 wherein said stationary surface comprises a work piece.

* * * * *